US010654988B2

(12) United States Patent
Mehl

(10) Patent No.: US 10,654,988 B2
(45) Date of Patent: May 19, 2020

(54) POLYOLEFIN COMPOSITION

(71) Applicant: Milliken & Company, Spartanburg, SC (US)

(72) Inventor: Nathan A. Mehl, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 16/373,325

(22) Filed: Apr. 2, 2019

(65) Prior Publication Data

US 2019/0225770 A1    Jul. 25, 2019

Related U.S. Application Data

(63) Continuation of application No. 15/382,115, filed on Dec. 16, 2016.

(60) Provisional application No. 62/274,086, filed on Dec. 31, 2015.

(51) Int. Cl.
| | | |
|---|---|---|
| *C08K 5/053* | (2006.01) | |
| *C08K 5/1575* | (2006.01) | |
| *C08K 5/103* | (2006.01) | |
| *C08K 5/20* | (2006.01) | |

(52) U.S. Cl.
CPC .............. *C08K 5/053* (2013.01); *C08K 5/103* (2013.01); *C08K 5/1575* (2013.01); *C08K 5/20* (2013.01)

(58) Field of Classification Search
CPC .......... C08K 5/053; C08K 5/20; C08K 5/103; C08K 5/1575

USPC .......................................................... 524/229
See application file for complete search history.

(56) References Cited

U.S. PATENT DOCUMENTS

| | | | |
|---|---|---|---|
| 4,371,645 A | | 2/1983 | Mahaffey, Jr. |
| 4,611,024 A | | 9/1986 | Wolfe |
| 5,049,605 A | | 9/1991 | Rekers |
| 5,731,474 A | | 3/1998 | Scrivens et al. |
| 6,582,503 B2 | | 1/2003 | Dotson et al. |
| 7,157,510 B2 | | 1/2007 | Xie et al. |
| 7,262,236 B2 | | 8/2007 | Xie et al. |
| 8,022,133 B2 | | 9/2011 | Xu et al. |
| 2002/0188044 A1 | | 12/2002 | Dotson et al. |
| 2003/0008953 A1 | | 1/2003 | Dotson et al. |
| 2006/0173108 A1 | | 8/2006 | Xu et al. |
| 2013/0289176 A1 * | | 10/2013 | Li .......................... C08K 5/1575 524/108 |
| 2013/0296580 A1 | | 11/2013 | Uppara et al. |

FOREIGN PATENT DOCUMENTS

| | | |
|---|---|---|
| EP | 0 524 404 A1 | 1/1993 |
| EP | 0 953 598 A1 | 11/1999 |
| EP | 2 350 187 A1 | 8/2011 |
| WO | WO 2000/69967 A1 | 11/2000 |
| WO | WO 2002/20528 A2 | 3/2002 |
| WO | WO 2016/109708 A1 | 7/2016 |

* cited by examiner

*Primary Examiner* — Hui H Chin
(74) *Attorney, Agent, or Firm* — Robert M. Lanning

(57) ABSTRACT

A polyolefin composition comprises a polypropylene polymer, 1,3:2,4-bis-O-[(3,4-dichlorophenyl)methylene]-D-glucitol, and an ester composition or an amide compound.

12 Claims, No Drawings

POLYOLEFIN COMPOSITION

CROSS REFERENCE TO RELATED APPLICATIONS

This application is a continuation of U.S. patent application Ser. No. 15/382,115 filed on Dec. 16, 2016, which application claims, pursuant to 35 U.S.C. § 119(e)(1), priority to and the benefit of the filing date of U.S. Patent Application No. 62/274,086 filed on Dec. 31, 2016, both of which applications are herein incorporated by reference.

TECHNICAL FIELD OF THE INVENTION

This application relates to polyolefin compositions comprising a combination of a clarifying agent and an ester composition or a combination of a clarifying agent and an amide compound.

BRIEF SUMMARY OF THE INVENTION

The invention generally provides polyolefin (e.g., polypropylene) compositions exhibiting improved (i.e., lower) haze levels. The polyolefin compositions generally comprise a combination of a clarifying agent and an ester composition or a combination of a clarifying agent and an amide compound.

In a first embodiment, the invention provides a polyolefin composition comprising:
(a) a polyolefin polymer;
(b) 1,3:2,4-bis-O-[(3,4-dichlorophenyl)methylene]-D-glucitol; and
(c) an ester composition comprising ester compounds, wherein at least a portion of the ester compounds are an ester of 1,2,3-propanetriol and at least one fatty acid selected from the group consisting of $C_{14}$-$C_{22}$ fatty acids.

In a second embodiment, the invention provides a polyolefin composition comprising:
(a) a polyolefin polymer;
(b) 1,3:2,4-bis-O-[(3,4-dichlorophenyl)methylene]-D-glucitol; and
(c) an amide compound selected from the group consisting of compounds conforming to a structure of Formula (I) or Formula (X) below

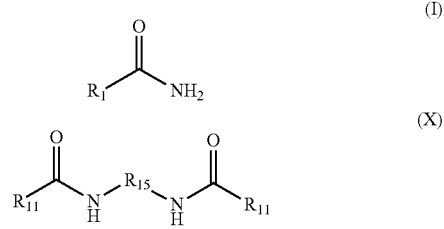

wherein $R_1$ and $R_{11}$ are independently selected from the group consisting of $C_7$-$C_{27}$ alkyl groups and $C_7$-$C_{27}$ alkenyl groups, and $R_{15}$ is selected from the group consisting of $C_1$-$C_8$ alkanediyl groups.

DETAILED DESCRIPTION OF THE INVENTION

In a first embodiment, the invention broadly provides a polyolefin composition comprising (a) a polyolefin polymer, (b) 1,3:2,4-bis-O-[(3,4-dichlorophenyl)methylene]-D-glucitol; and (c) an ester composition comprising ester compounds.

The polyolefin composition comprises a polyolefin polymer. The polyolefin polymer can be any suitable polyolefin, such as a polypropylene, a polyethylene, a polybutylene, a poly(4-methyl-1-pentene), and a poly(vinyl cyclohexane). In a preferred embodiment, the thermoplastic polymer is a polyolefin selected from the group consisting of polypropylene homopolymers (e.g., atactic polypropylene homopolymer, isotactic polypropylene homopolymer, and syndiotactic polypropylene homopolymer), polypropylene copolymers (e.g., polypropylene random copolymers), polypropylene impact copolymers, and mixtures thereof. Suitable polypropylene copolymers include, but are not limited to, random copolymers made from the polymerization of propylene in the presence of a comonomer selected from the group consisting of ethylene, but-1-ene (i.e., 1-butene), and hex-1-ene (i.e., 1-hexene). In such polypropylene random copolymers, the comonomer can be present in any suitable amount, but typically is present in an amount of less than about 10 wt. % (e.g., about 1 to about 7 wt. %). Suitable polypropylene impact copolymers include, but are not limited to, those produced by the addition of a copolymer selected from the group consisting of ethylene-propylene rubber (EPR), ethylenepropylene-diene monomer (EPDM), polyethylene, and plastomers to a polypropylene homopolymer or polypropylene random copolymer. In such polypropylene impact copolymers, the copolymer can be present in any suitable amount, but typically is present in an amount of from about 5 to about 25 wt. %. The polyolefin polymers described above can be branched or cross-linked, such as the branching or cross-linking that results from the addition of additives that increase the melt strength of the polymer.

The polyolefin polymer (e.g., polypropylene polymer) used in the composition can be a polymer that has been manufactured to possess the apparent melt viscosity, Melt Flow Rate, and/or Flow Rate Ratio described below for the polyolefin composition. For example, polypropylene polymers suitable for use in the composition include those manufactured in such a manner that the polymer sold by the manufacturer possesses one of the apparent melt viscosity values recited below for the polyolefin composition. Alternatively, a virgin polypropylene polymer that does not possess the desired characteristics can be modified through the addition of one or more additives. For example, the polymer can be combined with an organic peroxide or a vis-breaking agent and melt processed (e.g., extruded) in order to modify one or more characteristics of the polymer. Examples of organic peroxides suitable for such use include but are not limited to: 2,5-dimethyl-2,5-di(tert-butylperoxy) hexane, 2,5-dimethyl-2,5-di(tert-butyl peroxy)hexyne-3,3,6,6,9,9-pentamethyl-3-(ethyl acetate)-1,2,4,5-tetraoxy cyclononane, tert-butyl hydroperoxide, hydrogen peroxide, dicumyl peroxide, tert-butyl peroxy isopropyl carbonate, di-tert-butyl peroxide, p-chlorobenzoyl peroxide, dibenzoyl diperoxide, tert-butyl cumyl peroxide, tert-butyl hydroxyethyl peroxide, di-tert-amyl peroxide, 2,5-dimethylhexene-2,5-diperisononanoate, acetylcyclohexanesulphonyl peroxide, diisopropyl peroxydicarbonate, tert-amyl perneodecanoate, tert-butyl-perneodecanoate, tert-butylperpivalate, tert-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl) peroxide, disuccinoyl peroxide, diacetyl peroxide, dibenzoyl peroxide, tert-butyl per-2-ethylhexanoate, bis(4-chlorobenzoyl)peroxide, tert-butyl perisobutyrate, tert-butyl permaleate, 1,1-bis(tert-butylperoxy)-3,5,5-trimethylcyclohexane, 1,1-bis(tert-butylperoxy)cyclohexane, tert-butyl peroxyisopropyl carbonate, tert-butyl perisononaoate, 2,5-dimethylhexane 2,5-dibenzoate, tert-butyl peracetate, tert-amyl perbenzoate, tert-butyl perbenzoate, 2,2-bis(tert-butylperoxy)butane, 2,2-bis(tert-butylperoxy)propane, dicumyl peroxide, 2,5-dimethylhexane 2,5-di-tert-butylperoxid, 3-tert-butylperoxy-3-phenyl phthalide, di-tert-amyl peroxide, α,α'-bis(tert-butylperoxyisopropyl)benzene, 3,5-bis(tert-butylperoxy)-3,5-dimethyl-1,2-dioxolane, di-tert-butyl peroxide, 2,5-dimethylhexyne 2,5-di-tert-butyl peroxide, 3,3,6,6,9,9-hexamethyl-1,2,4,5-tetraoxacyclononane, p-menthane hydroperoxide, pinane hydroperoxide, diisopropylbenzene mono-α-hydroperoxide, cumene hydroperoxide or tert-butyl hydroperoxide.

When used as an additive to modify the characteristics of the polymer via melt processing of the polymer, the organic peroxide or vis-breaking agent can be present in the polymer composition (prior to melt processing) in any suitable amount. The suitable amount of organic peroxide will depend upon several factors, such as the particular polymer that is used in the composition, the starting properties of the polymer, and the desired change in the properties of the polymer. In a preferred embodiment, the organic peroxide can be present in the polymer composition (prior to melt processing) in an amount of about 10 ppm or more, about 50 ppm or more, or about 100 ppm or more, based on the total weight of the polymer composition. In another preferred embodiment, the organic peroxide can be present in the polymer composition (prior to melt processing) in an amount of about 1 wt. % (10,000 ppm) or less, about 0.5 wt. % (5,000 ppm) or less, about 0.4 wt. % (4,000 ppm) or less, about 0.3 wt. % (3,000 ppm) or less, about 0.2 wt. % (2,000 ppm) or less, or about 0.1 wt. % (1,000 ppm) or less, about 0.05 wt. % (about 500 ppm) or less based on the total weight of the polymer composition. Thus, in a series of preferred embodiments, the organic peroxide can be present in the polymer composition (prior to melt processing) in an amount of about 10 to about 5,000 ppm, about 50 to about 3,000 ppm, about 50 to about 2,000 ppm, or about 100 to about 1,000 ppm, based on the total weight of the polymer composition. As will be understood by those skilled in the art, the organic peroxide degrades and is consumed during the melt processing of the polymer composition. Therefore, the amount of organic peroxide present in the polymer composition after melt processing likely will not fall within the ranges recited above, and typically, the organic peroxide is not detectable in the polymer composition after melt processing.

As noted above, the polyolefin composition comprises 1,3:2,4-bis-O-[(3,4-dichlorophenyl)methylene]-D-glucitol. This compound is an acetal that can be produced by the reaction of an alditol with a substituted benzenecarbaldehyde compound. More specifically, the compound can be produced by the reaction of approximately 1 mole of D-glucitol with approximately 2 moles of 3,4-dichlorobenzenecarbaldehyde. The 1,3:2,4-bis-O-[(3,4-dichlorophenyl)methylene]-D-glucitol can be provided in any suitable physical form, but generally the compound is provided in the form of a powder.

As noted above, the 1,3:2,4-bis-O-[(3,4-dichlorophenyl)methylene]-D-glucitol typically is provided in the form of a powder, which powder contains many fine particles. The particles present in the powder generally are grouped into three different particle types of increasing size and complexity: primary particles; aggregates; and agglomerates. The primary particles generally are single crystals of the compound or fragments of such single crystals. The aggregates are comprised of two or more primary particles that have become strongly bound to each other. The aggregates cannot be reduced in size (e.g., reduced to their constituent primary particles) except through milling. The agglomerates are comprised of several primary particles and/or aggregates that have become weakly associated or bound together. The agglomerates can be reduced in size (e.g., broken apart and reduced to their constituent primary particles and/or aggregates) by the application of relatively modest mechanical forces. For example, the agglomerates can be reduced in size upon dispersion in a suitable liquid medium. The agglomerates typically contain relatively large voids within their interior dimensions, and these voids are filled with air. When such agglomerates are dispersed in the molten polymer during processing, the agglomerates break apart as the compound dissolves in the molten polymer. The air trapped in the voids can then become entrained in the molten polymer, and this entrained air leads to the formation of defects (e.g., white specks and/or bubbles) in the polymer composition.

The powder can have any suitable particle size. However, in order to facilitate dissolution of the compounds in the molten polymer and prevent the formation of defects (e.g., white specks or bubbles) in the polymer composition, it is advantageous for the particles to have a relatively small particle size. In a preferred embodiment, the volume mean diameter (i.e., the D[4,3]) of the 1,3:2,4-bis-O-[(3,4-dichlorophenyl)methylene]-D-glucitol particles is about 40 μm or less, about 35 μm or less, about 30 μm or less, or about 25 μm or less. Further, the $D_{90}$ of the 1,3:2,4-bis-O-[(3,4-dichlorophenyl)methylene]-D-glucitol particles preferably is about 80 μm or less, about 75 μm or less, about 70 μm or less, about 65 μm or less, about 60 μm or less, or about 55 μm or less.

The particle size of the 1,3:2,4-bis-O-[(3,4-dichlorophenyl)methylene]-D-glucitol can be measured using any suitable technique. For example, the particle size of the powder can be measured via dynamic light scattering using one of the many commercially available instruments designed for such measurements. When a dynamic light scattering technique is used, a representative sample of the particles generally is dispersed in a liquid medium and a sample of this liquid medium is introduced into the dynamic light scattering instrument. Any suitable liquid medium can be used, but water generally is the preferred medium. In order to facilitate dispersion of the particles in the liquid medium, a surfactant, preferably a non-ionic surfactant (e.g., an octylphenol surfactant), can be added to the water and the resulting mixture (i.e., water, surfactant, and particles) can be stirred for a sufficient time for the particles to disperse (e.g., for 1-5 minutes).

The 1,3:2,4-bis-O-[(3,4-dichlorophenyl)methylene]-D-glucitol can be present in the polyolefin composition in any suitable absolute amount. Typically, the amount of 1,3:2,4-bis-O-[(3,4-dichlorophenyl)methylene]-D-glucitol present in the polyolefin composition is about 250 parts-per-million (ppm) or more based on the weight of the polymer (e.g., polypropylene polymer) present in the polyolefin composition. Preferably, the amount of 1,3:2,4-bis-O-[(3,4-dichlorophenyl)methylene]-D-glucitol present in the polyolefin composition is about 500 ppm or more, about 750 ppm or more, about 1,000 ppm or more, about 1,250 ppm or more, or about 1,500 ppm or more based on the weight of the polymer (e.g., polypropylene polymer) present in the polyolefin composition. The amount of 1,3:2,4-bis-O-[(3,4-dichlorophenyl)methylene]-D-glucitol present in the polyolefin composition typically is also about 4,000 ppm or less based on the weight of the polymer (e.g., polypropylene polymer) present in the polyolefin composition. Preferably, the amount of 1,3:2,4-bis-O-[(3,4-dichlorophenyl)methylene]-D-glucitol present in the polyolefin composition is about 3,500 ppm or less, about 3,000 ppm or less, about 2,750 ppm or less, about 2,500 ppm or less, about 2,250 ppm or less, or about 2,000 ppm or less based on the weight of the polymer (e.g., polypropylene polymer) present in the polyolefin composition. Thus, in a series of sequentially more preferred embodiments, the amount of 1,3:2,4-bis-O-[(3,4-dichlorophenyl)methylene]-D-glucitol present in the polyolefin composition is about 250 ppm to about 4,000 ppm, about 250 ppm to about 3,000 ppm, about 250 ppm to about 2,500 ppm, or about 500 ppm to about 2,000 ppm based on the weight of the polymer (e.g., polypropylene polymer) present in the polyolefin composition.

In certain possibly preferred embodiments, the polyolefin composition can comprise another acetal compound in addition to the 1,3:2,4-bis-O-[(3,4-dichlorophenyl)methylene]-D-glucitol. In a particularly preferred embodiment, the polyolefin composition additionally comprises 1,3:2,4-bis-O-[(3,4-dimethylphenyl)methylene]-D-glucitol. The 1,3:2,4-bis-O-[(3,4-dimethylphenyl)methylene]-D-glucitol can be produced by the reaction of approximately 1 mole of D-glucitol with approximately 2 moles of o-xylenecarbaldehyde. The 1,3:2,4-bis-O-[(3,4-dimethylphenyl)methylene]-D-glucitol can be provided in any suitable physical form, but, as with the 1,3:2,4-bis-O-[(3,4-dichlorophenyl)methylene]-D-glucitol, the compound generally is provided in the form of a powder containing may fine particles.

The particle size of the 1,3:2,4-bis-O-[(3,4-dimethylphenyl)methylene]-D-glucitol can be the same (e.g., in terms of volume mean diameter, $D_{90}$, or both) as the particle size of the 1,3:2,4-bis-O-[(3,4-dichlorophenyl)methylene]-D-glucitol described above. Alternatively, the particle size of the 1,3:2,4-bis-O-[(3,4-dimethylphenyl)methylene]-D-glucitol can be smaller (e.g., in terms of volume mean diameter, $D_{90}$, or both) than the particle size of the 1,3:2,4-bis-O-[(3,4-dichlorophenyl)methylene]-D-glucitol. In a preferred embodiment, the volume mean diameter (i.e., the D[4,3]) of the 1,3:2,4-bis-O-[(3,4-dimethylphenyl)methylene]-D-glucitol particles is about 40 µm or less, about 35 µm or less, about 30 µm or less, about 25 µm or less, about 20 µm or less, about 15 µm or less, about 10 µm or less, or about 7.5 µm or less. Further, the $D_{90}$ of the 1,3:2,4-bis-O-[(3,4-dimethylphenyl)methylene]-D-glucitol particles preferably is about 80 µm or less, about 75 µm or less, about 70 µm or less, about 65 µm or less, about 60 µm or less, about 55 µm or less, about 50 µm or less, about 45 µm or less, about 40 µm or less, about 35 µm or less, about 30 µm or less, about 25 µm or less, about 20 µm or less, about 15 µm or less, about 10 µm or less, or about 7.5 µm or less.

When present in the polyolefin composition, the 1,3:2,4-bis-O-[(3,4-dimethylphenyl)methylene]-D-glucitol can be present in any suitable amount. For example, the 1,3:2,4-bis-O-[(3,4-dimethylphenyl)methylene]-D-glucitol can be present in any of the amounts listed above for the 1,3:2,4-bis-O-[(3,4-dichlorophenyl)methylene]-D-glucitol. Alternatively, the combined amount of 1,3:2,4-bis-O-[(3,4-dichlorophenyl)methylene]-D-glucitol and 1,3:2,4-bis-O-[(3,4-dimethylphenyl)methylene]-D-glucitol present in the composition can fall within any of the ranges described above for the 1,3:2,4-bis-O-[(3,4-dichlorophenyl)methylene]-D-glucitol.

When the composition comprises both 1,3:2,4-bis-O-[(3,4-dichlorophenyl)methylene]-D-glucitol and 1,3:2,4-bis-O-[(3,4-dimethylphenyl)methylene]-D-glucitol, the two compounds can be present in the polyolefin composition in any suitable relative amounts. For example, the ratio of the mass of 1,3:2,4-bis-O-[(3,4-dimethylphenyl)methylene]-D-glucitol present in the composition to the mass of 1,3:2,4-bis-O-[(3,4-dichlorophenyl)methylene]-D-glucitol present in the composition preferably can be about 9:1 or less, about 8:1 or less, about 7:1 or less, about 6:1 or less, about 5:1 or less, about 4:1 or less, or about 3:1 or less. The ratio of the mass of 1,3:2,4-bis-O-[(3,4-dimethylphenyl)methylene]-D-glucitol present in the composition to the mass of 1,3:2,4-bis-O-[(3,4-dichlorophenyl)methylene]-D-glucitol present in the composition preferably can be about 1:9 or more, about 1:8 or more, about 1:7 or more, about 1:6 or more, about 1:5 or more, about 1:4 or more, or about 1:3 or more. In one preferred embodiment, the ratio of the mass of 1,3:2,4-bis-O-[(3,4-dimethylphenyl)methylene]-D-glucitol present in the composition to the mass of 1,3:2,4-bis-O-[(3,4-dichlorophenyl)methylene]-D-glucitol present in the composition is about 9:1 to about 1:9. In a series of sequentially more preferred embodiments, the ratio of the mass of 1,3:2,4-bis-O-[(3,4-dimethylphenyl)methylene]-D-glucitol present in the composition to the mass of 1,3:2,4-bis-O-[(3,4-dichlorophenyl)methylene]-D-glucitol present in the composition is about 8:1 to about 1:8, about 7:1 to about 1:7, about 6:1 to about 1:6, about 5:1 to about 1:5, about 4:1 to about 1:4, or about 3:1 to about 1:3.

The polyolefin composition comprises an ester composition, and the ester composition comprises at least one ester compound. The ester composition can comprise a plurality of different ester compounds. Preferably, at least a portion of the ester compounds present in the ester composition are an ester of 1,2,3-propanetriol and at least one fatty acid selected from the group consisting of $C_{14}$-$C_{22}$ fatty acids. The $C_{14}$-$C_{22}$ fatty acid can be selected from the group consisting of saturated fatty acids and unsaturated fatty acids, with saturated fatty acids being particularly preferred. In a preferred embodiment, at least a portion of the ester compounds present in the ester composition are an ester of 1,2,3-propanetriol and at least one fatty acid selected from the group consisting of $C_{16}$-$C_{18}$ fatty acids, with $C_{16}$-$C_{18}$ saturated fatty acids being particularly preferred. In another preferred embodiment, the ester composition comprises about 80% or more monoester compounds, more preferably about 85% or more monoester compounds, and most preferably about 90% or more monoester compounds. In a preferred embodiment, the ester composition comprises 2,3-dihydroxypropyl octadecanoate. More preferably, the ester composition comprises about 50% or more 2,3-dihydroxypropyl octadecanoate.

As noted above, the ester composition can comprise a plurality of different ester compounds. The presence of different ester compounds can be due, at least in part, to the distribution of different chain lengths in the fatty acid. For example, as is understood by those of ordinary skill in the art, a composition comprising a $C_{18}$ fatty acid can also contain appreciable amounts of a $C_{16}$ fatty acid. Thus, in the embodiment in which the ester composition comprises 2,3-dihydroxypropyl octadecanoate, the ester composition can also contain 2,3-dihydroxypropyl hexadecanoate. The amount of these related ester compounds present in the ester composition will depend, at least in part, on the particular source of fatty acid that is used. Naturally-derived sources of fatty acids can have relatively high amounts (e.g., up to 40% or more) of these related fatty acids.

The ester composition can be present in the polyolefin composition in any suitable amount. Preferably, the ester composition is present in the polyolefin composition in an amount of about 50 ppm or more, more preferably about 100 ppm or more. In another preferred embodiment, the ester composition is present in the polyolefin composition in an amount of about 5,000 ppm or less, more preferably about 4,000 ppm or less, and most preferably about 3,000 ppm or less. Thus, in a particularly preferred embodiment, the ester composition is present in the polyolefin composition in an amount of about 50 ppm to about 5,000 ppm. In another particularly preferred embodiment, the ester composition is present in the polyolefin composition in an amount of about 100 ppm to about 3,000 ppm.

In a second embodiment, the invention provides a polyolefin composition comprising (a) a polypropylene polymer; (b) 1,3:2,4-bis-O-[(3,4-dichlorophenyl)methylene]-D-glucitol; and (c) an amide compound. The polypropylene polymer present in the composition can be any of the polymers discussed above in connection with the first embodiment of the invention. The 1,3:2,4-bis-O-[(3,4-dichlorophenyl)methylene]-D-glucitol present in the polyolefin composition can exhibit any of the characteristics described above in connection with the first embodiment of the invention and can be present in the composition in any of the amounts described above in connection with the first embodiment of the invention. Further, the polyolefin composition can further comprise 1,3:2,4-bis-O-[(3,4-dimethylphenyl)methylene]-D-glucitol, and this compound can be present in the polyolefin composition in any of the amounts described above in connection with the first embodiment of the invention.

As noted above, the polyolefin composition of the second embodiment comprises an amide compound. The polyolefin composition can also comprises a plurality of different amide compounds. Preferably, the polyolefin composition comprises an amide compound selected from the group consisting of compounds conforming to a structure of Formula (I) or Formula (X)

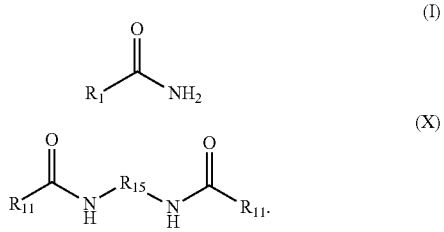

In the structure of Formula (I) and Formula (X), $R_1$ and $R_{11}$ are independently selected from the group consisting of $C_7$-$C_{27}$ alkyl groups and $C_7$-$C_{27}$ alkenyl groups, and $R_{15}$ is selected from the group consisting of $C_1$-$C_8$ alkanediyl groups. In a preferred embodiment, the polyolefin composition comprises an amide compound conforming to the structure of Formula (I) wherein $R_1$ is selected from the group consisting of $C_{17}$-$C_{21}$ alkenyl groups. In one preferred embodiment, the polyolefin composition comprises an amide compound conforming to the structure of Formula (I) wherein $R_1$ is (Z)-12-heneicosen-1-yl. In another preferred embodiment, the polyolefin composition comprises an amide compound conforming to the structure of Formula (I) wherein $R_1$ is (Z)-8-heptadecen-1-yl. In another preferred embodiment, the polyolefin composition comprises an amide compound conforming to the structure of Formula (X) wherein $R_{11}$ is selected from the group consisting of $C_7$-$C_{27}$ alkyl groups, with $C_{15}$-$C_{21}$ alkyl groups being particularly preferred. In another preferred embodiment, the polyolefin composition comprises an amide compound conforming to the structure of Formula (X) wherein $R_{15}$ is selected from the group consisting of $C_1$-$C_3$ alkanediyl groups, with an ethane-1,2-diyl group being particularly preferred. Thus, in a particularly preferred embodiment, the polyolefin composition comprises an amide compound conforming to the structure of Formula (X) wherein each $R_{11}$ is heptadecan-1-yl and $R_{15}$ is ethane-1,2-diyl.

As noted above, the polyolefin composition can comprise a mixture of different amide compounds. As with the ester compounds described in the first embodiment, the presence of these different amide compounds can be due, at least in part, to the distribution of different chain lengths in the fatty acid used in making the amide compound. Thus, a polyolefin composition comprising an amide compound conforming to the structure of Formula (I) wherein $R_1$ is (Z)-8-heptadecen-1-yl may also comprise an amide compound conforming to the structure of Formula (I) wherein $R_1$ is a $C_{15}$ alkenyl group. Further, the polyolefin composition can comprise a mixture of one or more amide compounds conforming to the structure of Formula (I) and one or more amide compounds conforming to the structure of Formula (X).

The amide compound can be present in the polyolefin composition in any suitable amount. Preferably, the amide compound is present in the polyolefin composition in an amount of about 50 ppm or more, more preferably about 100 ppm or more. In another preferred embodiment, the amide compound is present in the polyolefin composition in an amount of about 5,000 ppm or less, more preferably about 4,000 ppm or less, and most preferably about 3,000 ppm or less. Thus, in a particularly preferred embodiment, the amide compound is present in the polyolefin composition in an amount of about 50 ppm to about 5,000 ppm. In another particularly preferred embodiment, the amide compound is present in the polyolefin composition in an amount of about 100 ppm to about 3,000 ppm. When the polyolefin composition comprises more than one amide compound, each amide compound can be present in the composition in an amount falling within the ranges described above, or the total amount of amide compounds present in the polyolefin composition can fall within the ranges described above. Preferably, the total amount of amide compounds present in the polyolefin composition falls within the ranges described above.

The polyolefin compositions described herein can have any suitable apparent melt viscosity. The apparent melt viscosity of the polyolefin composition can be measured using any suitable method. For example, the apparent melt viscosity can be determining using the test method described in ASTM Test Method D3835-08 entitled "Standard Test Method for Determination of Properties of Polymeric Materials by Means of a Capillary Rheometer." While this test method provides that 220° C. is the testing temperature typically employed in testing polypropylene compositions, a temperature of 190° C. is believed to be more suitable temperature since it better approximates the lower processing temperatures that are today employed with many commercial polymers. Thus, the apparent melt viscosities for the polypropylene-containing polyolefin compositions listed herein preferably are determined using the above-referenced test method at a temperature of 190° C. The apparent melt viscosity of the polyolefin composition can be measured at any suitable apparent shear rate. It is believed that an apparent shear rate of 100 s$^{-1}$ is preferred because it closely approximates the shear that a polymer composition experiences during typical processing conditions. When measuring the apparent melt viscosity of the polyolefin composition, the capillary rheometer preferably is equipped with a 1.00 mm diameter capillary die with a length to diameter ratio of 30:1. Further, the polyolefin composition preferably is allowed to remain in the capillary rheometer for a dwell time of six (6) minutes prior to beginning the test. Lastly, the apparent melt viscosity of the polyolefin composition preferably is determined after the polymer, 1,3:2,4-bis-O-[(3,4-dichlorophenyl)methylene]-D-glucitol, ester composition and/or amide compound, and optional components have been melt processed (e.g., passed through an extruder).

Preferably, the polyolefin composition has an apparent melt viscosity of about 750 Pa·s or less at an apparent shear rate of 100 s$^{-1}$. More preferably, the polyolefin composition has an apparent melt viscosity of about 700 Pa·s or less, about 650 Pa·s or less, about 600 Pa·s or less, about 550 Pa·s or less, about 500 Pa·s or less, about 450 Pa·s or less, about 400 Pa·s or less, about 350 Pa·s or less, about 300 Pa·s or less, about 250 Pa·s or less, or about 200 Pa·s or less at an apparent shear rate of 100 s$^{-1}$ and a temperature of 190° C.

The polyolefin composition described herein can have any suitable Melt Flow Rate. The Melt Flow Rate of the polyolefin composition can be determined by any suitable method. For example, the Melt Flow Rate of the polyolefin composition can be determined using Procedure B in ASTM Standard D1238-10 entitled "Standard Test Method for Melt Flow Rates of Thermoplastics by Extrusion Plastometer." The Melt Flow Rate of the polyolefin composition preferably is measured using the aforementioned standard test method. Preferably, the polyolefin composition has a Melt Flow Rate of 4 g/10 min or more. More preferably, the polyolefin composition has a Melt Flow Rate of about 8 g/10 min or more, about 10 g/10 min or more, about 12 g/10 min or more, about 20 g/10 min or more, about 35 g/10 min or more, or about 50 g/10 min or more. As in the measurement of the apparent melt viscosity, the Melt Flow Rate of the polyolefin composition preferably is determined after the polymer, the 1,3:2,4-bis-O-[(3,4-dichlorophenyl)methylene]-D-glucitol, ester composition and/or amide compound, and any optional components (e.g., peroxide) have been melt processed (e.g., passed through an extruder).

As will be understood by those of ordinary skill in the art, the polyolefin polymer will contain a population of discrete polymer chains, and those polymer chains will have varying lengths and molar masses. The statistical distribution of the lengths/molar masses of the polymer chains contained in the polymer is generally referred to as the molar mass distribution or molecular weight distribution. The polyolefin polymers used in the compositions described herein can have any suitable molar mass distribution. For example, the polyolefin polymer can have a molar mass distribution exhibiting a single mode or the molar mass distribution can exhibit a plurality of modes (e.g., bimodal, trimodal, etc.). The breadth of the molar mass distribution of a polymer can be expressed using the polydispersity index. The polydispersity index is calculated by measuring the number average molar mass and the mass average molar mass (i.e., weight average molar mass) of the polymer, and then dividing the mass average molar mass of the polymer by the number average molar mass of the polymer. The result is a dimensionless unit that quantifies the breadth of the molar mass distribution, with higher values indicating greater breadth in the molar mass distribution. The breadth of the molar mass distribution can also be indirectly quantified by measuring and comparing the Melt Flow Rate of the polymer (or a composition containing the polymer) under different conditions to yield a Flow Rate Ratio (FRR). This method is described, for example, in Procedure D of ASTM Standard D1238 entitled "Standard Test Method for Melt Flow Rates of Thermoplastics by Extrusion Plastometer." Preferably, the FRR is calculated using the Melt Flow Rate measured using the 10 kg weight specified in the standard (MFR$_{10}$) and the Melt Flow Rate measured using the 2 kg weight specified in the standard (MFR$_2$). The polyolefin composition described herein can have any suitable FRR. Preferably, the polyolefin composition has a FRR (MFR$_{10}$/MFR$_2$) of about 17 or less. More preferably, the polyolefin composition has a FRR (MFR$_{10}$/MFR$_2$) of about 16 or less or about 15 or less. As in measuring the apparent melt viscosity and the Melt Flow Rate, the Flow Rate Ratio of the polyolefin composition preferably is determined after the polymer, the 1,3:2,4-bis-O-[(3,4-dichlorophenyl)methylene]-D-glucitol, ester composition and/or amide compound, and any optional components (e.g., peroxide) have been melt processed (e.g., passed through an extruder).

The polyolefin compositions described herein can contain other polymer additives in addition to the 1,3:2,4-bis-O-[(3,4-dichlorophenyl)methylene]-D-glucitol and ester composition or amide compound. Suitable additional polymer additives include, but are not limited to, antioxidants (e.g., phenolic antioxidants, phosphite antioxidants, and combinations thereof), anti-blocking agents (e.g., amorphous silica and diatomaceous earth), pigments (e.g., organic pigments and inorganic pigments) and other colorants (e.g., dyes and polymeric colorants), fillers and reinforcing agents (e.g., glass, glass fibers, talc, calcium carbonate, and magnesium oxysulfate whiskers), nucleating agents, clarifying agents, acid scavengers (e.g., metal salts of fatty acids, such as the metal salts of stearic acid), polymer processing additives (e.g., fluoropolymer polymer processing additives), polymer cross-linking agents, slip agents (e.g., fatty acid amide compounds derived from the reaction between a fatty acid and ammonia or an amine-containing compound), fatty acid ester compounds (e.g., fatty acid ester compounds derived from the reaction between a fatty acid and a hydroxyl-containing compound, such as glycerol, diglycerol, and combinations thereof), and combinations of the foregoing.

As noted above, the polyolefin compositions can contain nucleating agents in addition to the other components described above. Suitable nucleating agents include, but are not limited to, 2,2'-methylene-bis-(4,6-di-tert-butylphenyl) phosphate salts (e.g., sodium 2,2'-methylene-bis-(4,6-di-tert-butylphenyl) phosphate or aluminum 2,2'-methylene-bis-(4,6-di-tert-butylphenyl)phosphate), bicyclo[2.2.1]heptane-2,3-dicarboxylate salts (e.g., disodium bicyclo[2.2.1]heptane-2,3-dicarboxylate or calcium bicyclo[2.2.1]heptane-2,3-dicarboxylate), cyclohexane-1,2-dicarboxylate salts (e.g., calcium cyclohexane-1,2-dicarboxylate, monobasic aluminum cyclohexane-1,2-dicarboxylate, dilithium cyclohexane-1,2-dicarboxylate, or strontium cyclohexane-1,2-dicarboxylate), and combinations thereof. For the bicyclo[2.2.1]heptane-2,3-dicarboxylate salts and the cyclohexane-1,2-dicarboxylate salts, the carboxylate moieties can be arranged in either the cis- or trans-configuration, with the cis-configuration being preferred.

As noted above, the polyolefin compositions can also contain one or more additional clarifying agents. Suitable clarifying agents include, but are not limited to, trisamides and acetal compounds that are the condensation product of a polyhydric alcohol and an aromatic aldehyde. Suitable trisamide clarifying agents include, but are not limited to, amide derivatives of benzene-1,3,5-tricarboxylic acid, amide derivatives of 1,3,5-benzenetriamine, derivatives of N-(3,5-bis-formylamino-phenyl)-formamide (e.g., N-[3,5-bis-(2,2-dimethyl-propionylamino)-phenyl]-2,2-dimethyl-propionamide), derivatives of 2-carbamoyl-malonamide (e.g., N,N'-bis-(2-methyl-cyclohexyl)-2-(2-methyl-cyclohexylcarbamoyl)-malonamide), and combinations thereof. As noted above, the clarifying agent can be an acetal compound that is the condensation product of a polyhydric alcohol and an aromatic aldehyde. Suitable polyhydric alcohols include acyclic polyols such as xylitol and sorbitol, as well as acyclic deoxy polyols (e.g., 1,2,3-trideoxynonitol or 1,2,3-trideoxynon-1-enitol). Suitable aromatic aldehydes typically contain a single aldehyde group with the remaining positions on the aromatic ring being either unsubstituted or substituted. Accordingly, suitable aromatic aldehydes include benzaldehyde and substituted benzaldehydes (e.g., 3,4-dimethyl-benzaldehyde or 4-propyl-benzaldehyde). The acetal compound produced by the aforementioned reaction can be a mono-acetal, di-acetal, or tri-acetal compound (i.e., a compound containing one, two, or three acetal groups, respectively), with the di-acetal compounds being preferred. Suitable acetal-based clarifying agents include, but are not limited to, the clarifying agents disclosed in U.S. Pat. Nos. 5,049,605; 7,157,510; and 7,262,236.

The polyolefin compositions described herein can be produced by any suitable method. For example, the polyolefin compositions can be produced by simple mixing (e.g., high shear or high intensity mixing) of the polyolefin polymer, the 1,3:2,4-bis-O-[(3,4-dichlorophenyl)methylene]-D-glucitol, the ester composition and/or amide compound, and any additional optional components. Alternatively, the 1,3:2,4-bis-O-[(3,4-dichlorophenyl)methylene]-D-glucitol and the ester composition and/or amide compound (as well as additional optional components, such as those described above) can be pre-blended to provide an additive composition. This additive composition can then be mixed with the polyolefin polymer to produce the polyolefin composition described above. The polyolefin composition can be provided in any form suitable for use in further processing to produce an article. For example, the polyolefin composition can be provided in the form of a powder (e.g., free-flowing powder), flake, pellet, prill, tablet, agglomerate, and the like.

The polyolefin compositions described herein are believed to be useful in producing thermoplastic articles. The polyolefin compositions can be formed into the desired thermoplastic article by any suitable technique, such as injection molding, injection rotational molding, blow molding (e.g., injection blow molding or injection stretch blow molding), extrusion (e.g., sheet extrusion, film extrusion, cast film extrusion, or foam extrusion), extrusion blow molding, thermoforming, rotomolding, film blowing (blown film), film casting (cast film), and the like.

The polyolefin compositions described herein can be used to produce any suitable article or product. Suitable products include, but are not limited to, medical devices (e.g., pre-filled syringes for retort applications, intravenous supply containers, and blood collection apparatus), food packaging, liquid containers (e.g., containers for drinks, medications, personal care compositions, shampoos, and the like), apparel cases, microwavable articles, shelving, cabinet doors, mechanical parts, automobile parts, sheets, pipes, tubes, rotationally molded parts, blow molded parts, films, fibers, and the like.

The following examples further illustrate the subject matter described above but, of course, should not be construed as in any way limiting the scope thereof.

Example 1

This example demonstrates the production of a polyolefin composition as described above and the properties of the resulting polyolefin composition.

Thirteen one-kilogram batches of a polypropylene random copolymer composition (Samples 1A-1C and Samples 2A-2J) were compounded in accordance with the formulations set forth in Tables 1 and 2 below. The polypropylene random copolymer used in the compositions was Pro-fax SA849 polypropylene random copolymer from LyondellBasell Polymers, which had an initial Melt Flow Rate of approximately 12 g/10 min. The 1,3:2,4-bis-O-[(3,4-dichlorophenyl)methylene]-D-glucitol (referred to as "C.A. X" in the tables that follow) was synthesized in the applicant's laboratory. 2,3-Dihydroxypropyl octadecanoate was obtained from a commercial source. The product contained approximately 86% 2,3-dihydroxypropyl octadecanoate, with the balance being related ester compounds.

TABLE 1

General formulation for Samples 1A-2J.

| Component | Amount |
| --- | --- |
| Polypropylene random copolymer flake | 1,000 g |
| Acid Scavenger (Calcium Stearate) | 0.40 g |
| Primary Antioxidant (Irganox ® 1010) | 0.50 g |
| Secondary Antioxidant (Irgafos ® 168) | 1.00 g |
| C.A. X | As noted in Table 2 below |
| 2,3-Dihydroxypropyl octadecanoate | As noted in Table 2 below |

TABLE 2

Amounts of Compound X and Compound Y used in Samples 1A-2J.

| Sample | Amount of C.A. X (g) | Amount of 2,3-Dihydroxypropyl octadecanoate (g) |
| --- | --- | --- |
| 1A | 0 | 0 |
| 1B | 0 | 0.50 |
| 1C | 0 | 1.00 |
| 2A | 1.00 | 0.0 |
| 2B | 1.25 | 0 |
| 2C | 1.00 | 0.05 |
| 2D | 1.00 | 0.1 |
| 2E | 1.00 | 0.5 |
| 2F | 1.00 | 0.75 |
| 2G | 1.00 | 1.0 |
| 2H | 1.00 | 1.25 |
| 2I | 1.00 | 1.5 |
| 2J | 1.00 | 2.0 |

Each of the polypropylene random copolymer compositions was compounded by blending the components in a Henschel high intensity mixer for approximately 1 minute at a blade speed of approximately 2,100 rpm. The samples were then melt compounded on a Deltaplast single screw compounding extruder with a 25 mm screw diameter and length/diameter ratio of 30:1. The barrel temperature was ramped from about 200° C. to about 230° C. using six heating zones. The extrudate (in the form a strand) for each sample was cooled in a water bath and subsequently pelletized.

Pellets of each of the resulting polyolefin compositions were molded into plaques with dimensions of approximately 51 mm×76 mm with a thickness of 1.27 mm using an Arburg 25 ton injection molder. All molder barrel zones were set to 230° C., and the mold was cooled to 21° C. Plaque dimensions were verified with a micrometer after aging for 24 hours. The haze of the plaques was measured in accordance with ASTM Standard D1103-92 using a BYK-Gardner Haze-Guard Plus. The measured percent haze for the plaques is reported in Table 3 below.

TABLE 3

Haze values of plaques made from Samples 1A-2J.

| Sample | Haze (%) |
|---|---|
| 1A | 45 |
| 1B | 46 |
| 1C | 46 |
| 2A | 31 |
| 2B | 23 |
| 2C | 28 |
| 2D | 27 |
| 2E | 24 |
| 2F | 22 |
| 2G | 21 |
| 2H | 20 |
| 2I | 19 |
| 2J | 17 |

As can be seen from the data shown in Table 3, polypropylene random copolymer compositions containing only 2,3-Dihydroxypropyl octadecanoate (samples 1B and 1C) do not have a lower haze than a comparable sample (1A) that contains no 2,3-Dihydroxypropyl octadecanoate. However, when 1,3:2,4-bis-O-[(3,4-dichlorophenyl)methylene]-D-glucitol ("C.A. X") was added to the same resin (samples 2A, 2B, and 2C), the haze was significantly lower than sample 1A. So, C.A. X clarifies polypropylene and 2,3-Dihydroxypropyl octadecanoate does not clarify polypropylene. Surprisingly, when both 2,3-Dihydroxypropyl octadecanoate and C.A. X are added to polypropylene, the haze is noticeably lower. Comparing the Haze of Sample 2A to Samples 2D-2J, it can be seen that the addition of 2,3-Dihydroxypropyl octadecanoate can lower the haze of polypropylene by as much as 45%.

Example 2

This example demonstrates the production of a polyolefin composition as described above and the properties of the resulting polyolefin composition.

Ten one-kilogram batches of a polypropylene random copolymer composition (Samples 3A-3J) were compounded in accordance with the formulations set forth in Tables 4 and 5 below. The polypropylene random copolymer and testing conditions were the same as those used in Example 1. An "Enhancing Additive" (E.A.) was added to each of the compositions. E.A. 1 was the same 2,3-dihydroxypropyl octadecanoate used in Example 1. E.A. 2 was an amide compound conforming to the structure of Formula (X) wherein each $R_{11}$ was heptadecan-1-yl and $R_{15}$ was ethane-1,2-diyl. E.A. 3 was an amide compound conforming to the structure of Formula (I) wherein $R_1$ was (Z)-8-heptadecen-1-yl. E.A. 4 was an amide compound conforming to the structure of Formula (I) wherein $R_1$ was (Z)-12-heneicosen-1-yl.

TABLE 4

General formulation for Samples 3A-3J.

| Component | Amount |
|---|---|
| Polypropylene random copolymer flake | 1,000 g |
| Acid Scavenger (Calcium Stearate) | 0.40 g |
| Primary Antioxidant (Irganox ® 1010) | 0.50 g |
| Secondary Antioxidant (Irgafos ® 168) | 1.00 g |
| C.A. X | As noted in Table 5 below |
| Enhancing Additive | As noted in Table 5 below |

TABLE 5

Amounts of C.A. X and Enhancing Additive used in Samples 3A-3J.

| Sample | Amount of C.A. X (g) | Amount of E.A. 1 (g) | Amount of E.A. 2 (g) | Amount of E.A. 3 (g) | Amount of E.A. 4 (g) |
|---|---|---|---|---|---|
| 3A | 1.00 | 0 | 1.0 | 0 | 0 |
| 3B | 1.00 | 0 | 0 | 1.0 | 0 |
| 3C | 1.00 | 0 | 0 | 0 | 1.0 |
| 3D | 1.25 | 1.25 | 0 | 0 | 0 |
| 3E | 1.25 | 0 | 1.25 | 0 | 0 |
| 3F | 1.25 | 0 | 0 | 1.25 | 0 |
| 3G | 1.50 | 1.5 | 0 | 0 | 0 |
| 3H | 1.50 | 0 | 1.5 | 0 | 0 |
| 3I | 1.50 | 0 | 0 | 1.5 | 0 |
| 3J | 1.50 | 0 | 0 | 0 | 1.0 |

The measured percent haze for the plaques are reported in Table 6 below.

TABLE 6

Haze values of plaques made from Samples 3A-3J.

| Sample | Haze (%) |
|---|---|
| 3A | 21 |
| 3B | 22 |
| 3C | 20 |
| 3D | 17 |
| 3E | 17 |
| 3F | 17 |
| 3G | 14 |
| 3H | 14 |
| 3I | 14 |
| 3J | 13 |

As can be seen from the data shown in Tables 2 and 6, the amide-based enhancing additives improve the performance of C.A. X. When either the amide-based or the ester-based enhancing additives are added to C.A. X, the haze is significantly lower than the haze of an identical level of neat C.A. X without the enhancing additive. For example, the haze of Sample 3C is 35% lower than the haze of Sample 2A.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A polyolefin composition comprising:
   (a) a polyolefin polymer;
   (b) 1,3:2,4-bis-O-[(3,4-dichlorophenyl)methylene]-D-glucitol; and
   (c) an amide compound selected from the group consisting of compounds conforming to a structure of Formula (I) or Formula (X) below

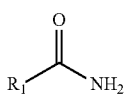

(I)

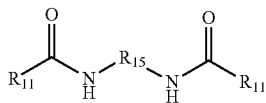

(X)

wherein $R_1$ and $R_{11}$ are independently selected from the group consisting of $C_7$-$C_{27}$ alkyl groups and $C_7$-$C_{27}$ alkenyl groups, and $R_{15}$ is selected from the group consisting of $C_1$-$C_8$ alkanediyl groups.

2. The polyolefin composition of claim 1, wherein $R_1$ is selected from the group consisting of $C_7$-$C_{27}$ alkenyl groups.

3. The polyolefin composition of claim 2, wherein $R_1$ is selected from the group consisting of $C_{17}$-$C_{21}$ alkenyl groups.

4. The polyolefin composition of claim 1, wherein the amide compound conforms to the structure of Formula (I) and $R_1$ is (Z)-12-heneicosen-1-yl.

5. The polyolefin composition of claim 1, wherein the amide compound conforms to the structure of Formula (I) and $R_1$ is (Z)-8-heptadecen-1-yl.

6. The polyolefin composition of claim 1, wherein $R_{11}$ is selected from the group consisting of $C_7$-$C_{27}$ alkyl groups.

7. The polyolefin composition of claim 1, wherein $R_{15}$ is selected from the group consisting of $C_1$-$C_3$ alkanediyl groups.

8. The polyolefin composition of claim 1, wherein the amide compound conforms to the structure of Formula (X), each $R_{11}$ is heptadecan-1-yl, and $R_{15}$ is ethane-1,2,-diyl.

9. The polyolefin composition of claim 1, wherein the 1,3:2,4-bis-O-[(3,4-dichlorophenyl)methylene]-D-glucitol is present in the polyolefin composition in an amount of about 250 ppm to about 3,000 ppm.

10. The polyolefin composition of claim 9, wherein the 1,3:2,4-bis-O-[(3,4-dichlorophenyl)methylene]-D-glucitol is present in the polyolefin composition in an amount of about 500 ppm to about 2,000 ppm.

11. The polyolefin composition of claim 1, wherein the amide compound is present in the polyolefin composition in an amount of about 50 ppm to about 5,000 ppm.

12. The polyolefin composition of claim 11, wherein amide compound is present in the polyolefin composition in an amount of about 100 ppm to about 3,000 ppm.

* * * * *